US008739395B2

(12) United States Patent
Chikyu

(10) Patent No.: US 8,739,395 B2
(45) Date of Patent: Jun. 3, 2014

(54) TERMINAL CRIMPING APPARATUS

(75) Inventor: Hisaomi Chikyu, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/617,067

(22) Filed: Sep. 14, 2012

(65) Prior Publication Data

US 2013/0000111 A1 Jan. 3, 2013

Related U.S. Application Data

(62) Division of application No. 12/007,760, filed on Jan. 15, 2008, now Pat. No. 8,316,539.

(30) Foreign Application Priority Data

Jan. 16, 2007 (JP) ................................ 2007-007368

(51) Int. Cl.
*B23P 19/00* (2006.01)
*H01R 43/042* (2006.01)

(52) U.S. Cl.
USPC .................. 29/753; 29/33 M; 29/748; 29/751

(58) Field of Classification Search
USPC .................. 29/753, 33 M, 748, 751, 861, 863
See application file for complete search history.

(56) References Cited

U.S. PATENT DOCUMENTS 4,805,278 A 2/1989 Bulanda et al.
4,916,810 A 4/1990 Yeomans
5,275,032 A 1/1994 Gloe et al.
5,337,589 A 8/1994 Gloe et al.
5,375,341 A 12/1994 College et al.
6,367,148 B1 4/2002 Caveney et al.

FOREIGN PATENT DOCUMENTS

JP s62-116481 5/1987
JP h1-313870 12/1989
JP h10-247577 9/1998
JP 2004-288524 A 10/2004
JP 2004288524 * 10/2004 ........... H01R 43/048

OTHER PUBLICATIONS

Office Action for Japanese Patent Application 2007-007368 issued Sep. 13, 2011.

* cited by examiner

*Primary Examiner* — Thiem Phan
(74) *Attorney, Agent, or Firm* — Edwards Wildman Palmer LLP

(57) ABSTRACT

The present invention is to provide an apparatus for crimping a terminal to an electrical wire, which have respective part numbers, and allows miniaturization of the apparatus. The apparatus includes a base, a drive portion, a plurality of applicators, a plurality of connection/disconnection portions and a control device. The drive portion drives the associated applicator to crimp the terminal to the electrical wire. The connection/disconnection portions each are disposed in one-to-one relation ship against the respective applicators. The each connection/disconnection portion is positionable at a connection and a disconnection position, where a driving force is transmitted to or released from the associated applicator. The control device controls the associated connection/disconnection portion so that the applicator corresponding to the part numbers of the electrical wire and the terminal can achieve crimping with the driving force from the drive portion.

7 Claims, 12 Drawing Sheets

TERMINAL CRIMPING APPARATUS

CROSS REFERENCE TO RELATED DOCUMENT

This application is a Division of U.S. application Ser. No. 12/007,760, filed on Jan. 15, 2008, now U.S. Pat. No. 8,316,539, which claims priority to Japan 2007-007368, filed on Jan. 16, 2007.

BACKGROUND OF THE INVENTION

1. Field of the Invention

The present invention relates to an apparatus for crimping an electrical terminal to an electrical wire, and relates to a method thereof.

2. Description of the Related Art

A variety of terminal crimping apparatuses are disclosed (for example, JP,S62-116481,A and JP,H01-313870). The terminal crimping apparatus includes an applicator having an anvil, a crimper and a drive portion. The drive portion effects relative movement of the anvil and the crimper to crimp the terminal to the electrical wire.

A motor vehicle utilizes a variety of the terminals and the electrical wires with various part numbers. The different part numbers of the electrical wire and the terminal require the different anvils and crimpers, and spacings therebetween. The conventional terminal crimping apparatuses referred above include a plurality of applicators for allowing crimping of the different part numbers of the electrical wires and terminals.

The applicators of the conventional apparatuses each include its own drive portion, so that the terminal crimping apparatuses tend to be enlarged.

The applicant of the present invention discloses a terminal crimping apparatus including a plurality of applicators each having a plurality of anvils and crimpers (JP,H10-247577,A). The desired anvils and crimpers are selected from the anvils and crimpers disposed on the apparatus.

The applicator of the crimping apparatus includes the plurality of the anvils and crimpers, so that the applicator tends to be enlarged. The terminal crimping apparatus actuates also the anvils and the crimpers which do not crimp the terminals to the electrical wires. The terminal crimping apparatus actuates all anvils and crimpers when one set of the anvil and crimper is operated.

This configuration increases size of the drive portion and also size of the terminal crimping apparatus.

SUMMARY OF THE INVENTION

An object of the present invention is to provide a terminal crimping apparatus to crimp terminals to electrical wires with a plurality of part numbers. The invention is capable of miniaturizing the terminal crimping apparatus.

According to a first aspect of the present invention, a terminal crimping apparatus includes: a plurality of applicators each including a first die and a second die opposing the first die for crimping a terminal to an electrical wire, the applicators each crimping a different part number of the terminal and the electrical wire together; a base supporting the applicators; a drive portion for producing a driving force to move the first die and the second die toward and away from each other, a number of the drive portion being smaller than that of the applicators; a plurality of connection/disconnection portions each positionable at a first state, in which the driving force is transmitted to the associated applicator, and a second state, in which the driving force is released from the applicator; and a control device for controlling the associated connection/disconnection portion so that the applicator corresponding to the part numbers of the electrical wire and the terminal can achieve crimping the electrical wire and the terminal together with the driving force from the drive portion.

Preferably, the each connection/disconnection portion includes a sliding member slidably positionable at a connection position and a disconnection position, the connection/disconnection portion being positioned between the drive portion and the applicator at the connection position, and positioned between and away from the drive portion and the applicator at the disconnection position, and a link portion disposed on the drive portion, the applicator and the sliding member, for connecting the drive portion with the applicator by means of the sliding member.

Preferably, the each link portion includes wide portions disposed on an upper end and a lower end of the each sliding member and extending in a sliding direction of the sliding member, a narrow portion disposed between the wide portions and extending in the sliding direction of the sliding member, the narrow portion being narrower than the wide portions, wide through holes disposed on the drive portion and the applicator, respectively, extending in the sliding direction of the sliding member for accepting the respective wide portions therein when the sliding member is positioned at the connection position, and narrow through holes disposed on the drive portion and the applicator, respectively, extending in the sliding direction of the sliding member for accepting the respective narrow portion therein when the sliding member is positioned at the connection position.

Preferably, the terminal crimping apparatus further includes a plurality of space adjusting portions each for adjusting a space between the first die and the second die of the associated applicator at the connection position.

Preferably, the each space adjusting portion includes a wedge member having a plurality of wedge portions for adjusting the spacing between the first die and the second die, the wedge member being insertable between the applicator and the sliding member, or between the sliding member and the drive portion, when the sliding member is positioned at the connection position.

Preferably, the each wedge member is integral with the associated sliding member.

Preferably, the each connection/disconnection portion is disposed on the each applicator.

According to a second aspect of the present invention, a method of crimping a terminal to an electrical wire with a terminal crimping apparatus including a plurality of applicators each having a first die and a second die opposing to the first die, the method includes the steps of: inputting part numbers of the electrical wire and the terminal and a number of crimping with an input device; selecting the applicator and a spacing between the first die and the second die, the applicator and the spacing corresponding to the numbers inputted; actuating a connection/disconnection portion relevant to the selected applicator to link a drive portion and the applicator; transmitting a driving force from the drive portion to the applicator for crimping the terminal to the electrical wire; and disconnecting link between the drive portion and the applicator with the connection/disconnection portion.

Preferably, the connection/disconnection portion is positioned at a connection position, in which the connection/disconnection portion is positioned between the drive portion and the applicator, and at a disconnection position, in which the connection/disconnection portion is positioned between and away from the drive portion and the applicator.

Preferably, the spacing between the first die and the second die of the associated applicator is adjusted with a space adjusting portion.

Preferably, the spacing between the first die and the second die is stepwise adjusted with a wedge member disposed on the space adjusting portion.

DETAILED DESCRIPTION OF THE PREFERRED EMBODIMENTS

Figure 1:
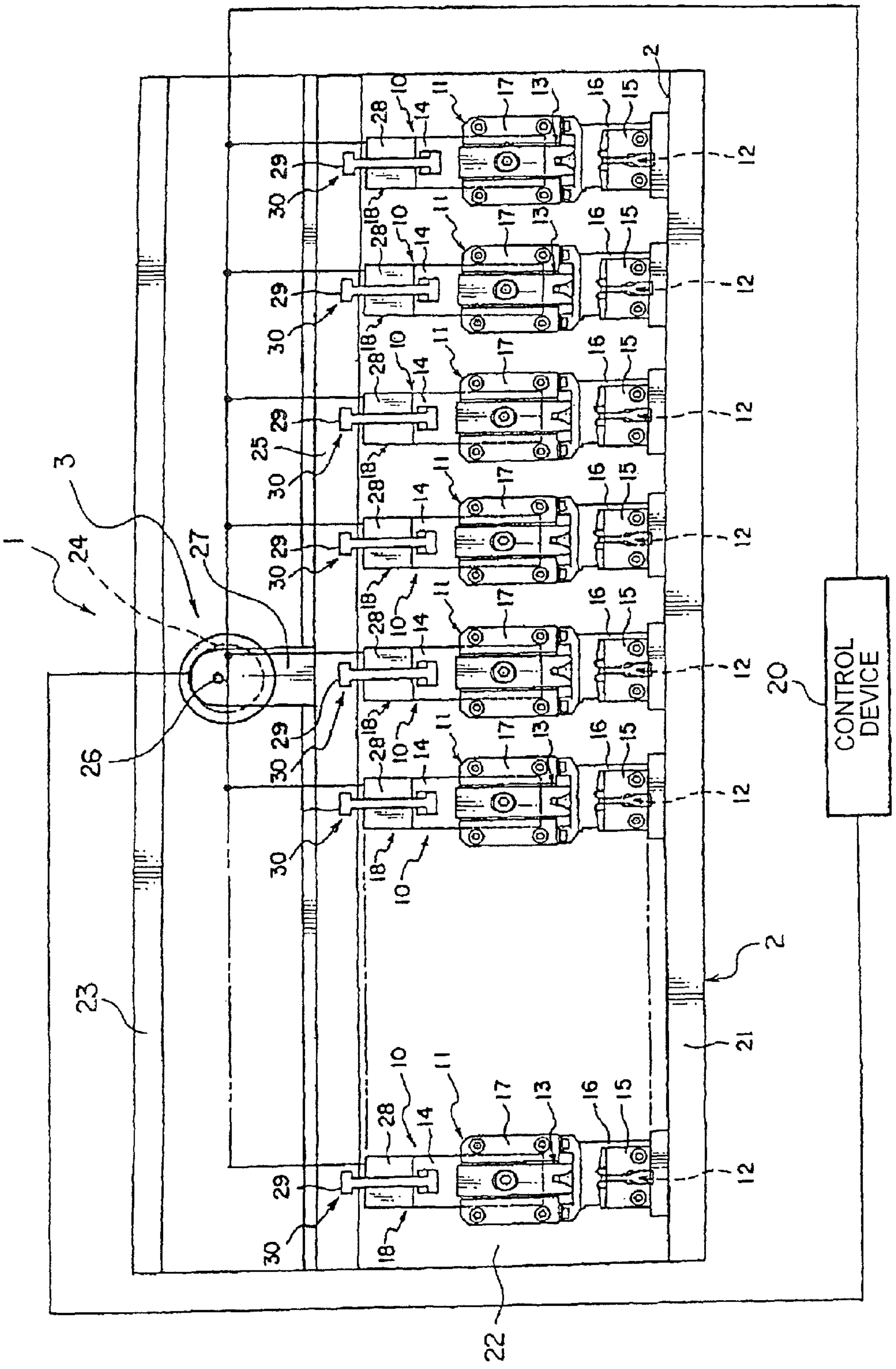
FIG. 1 is a front view of an embodiment of a terminal crimping apparatus of the present invention.
Figure 2:
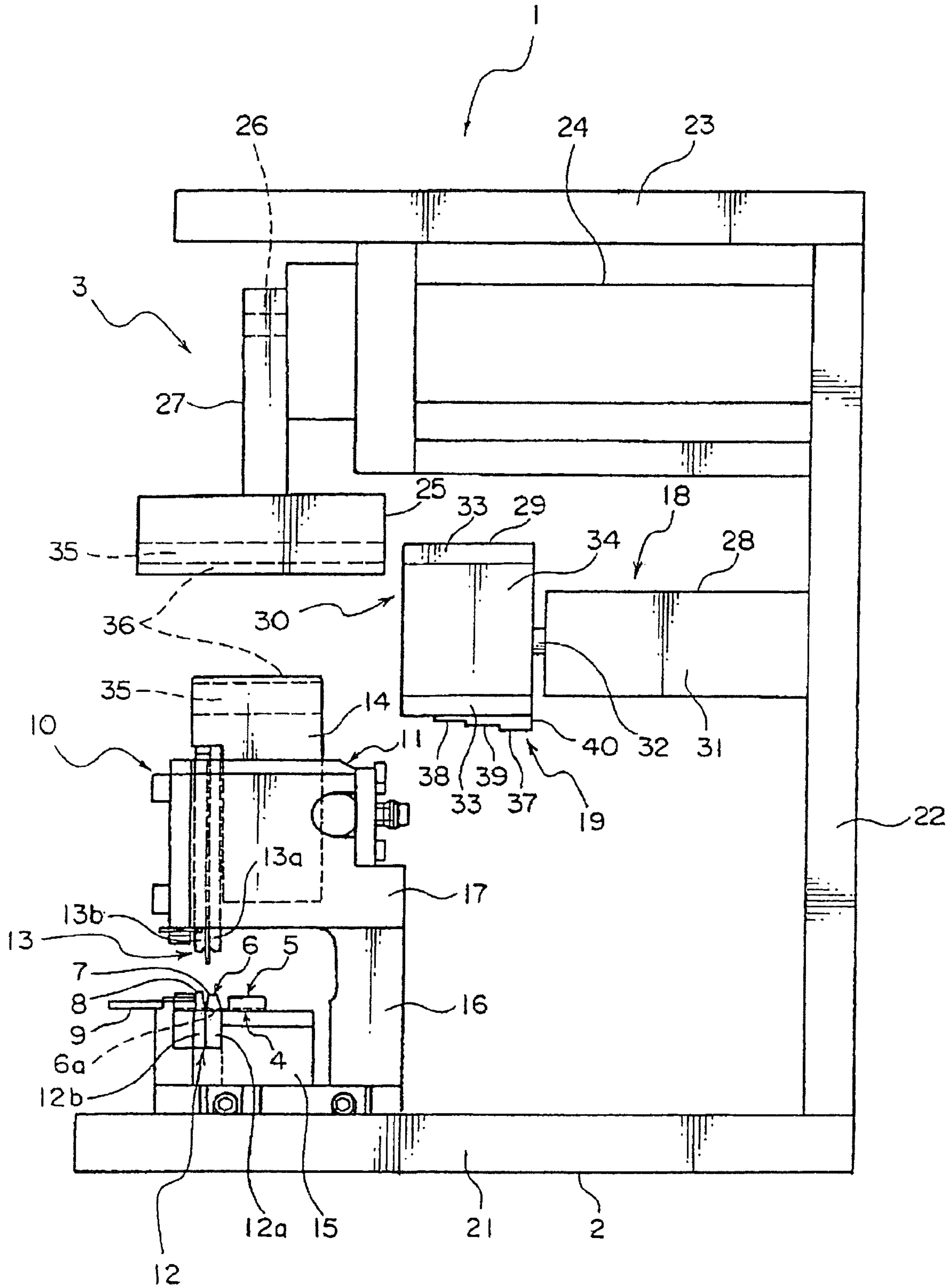
FIG. 2 is a side view showing an applicator of the terminal crimping apparatus of FIG. 1.

FIGS. 1-11 show an embodiment of a terminal crimping apparatus 1 for crimping an electrical terminal 4 to an end portion of an electrical wire 9 (FIG. 2).

The electrical wire 9 is the insulated conductive wire including a conductive core wire and a sheath covering the core wire. The electrical terminal 4 includes a contact section 5 and a connection section 6. The contact section 5 is connected to a mating terminal and the connection section 6 is connected to the electrical wire 9.

The connection section 6 includes a bottom wall 6*a*, a pair of wire crimping members 7 and a pair of insulation crimping members 8.

The wire and insulation crimping members 7 and 8 are crimped to the end portion of the electrical wire 8 to make electrical connection with the core wire. The connection section 6 of the terminal 4 accepts the electrical wire 9 of different size of diameters.

The electrical wires 9 have various part numbers, which define outer diameters thereof, and the terminals 4 have various part numbers, which define dimension, size and relative positions of the crimping members 7 and 8.

Referring to FIGS. 1 and 2, the terminal crimping apparatus 1 includes a base 2 installed on a floor of a factory, a drive portion 3, a plurality of applicators 10 to crimp the electrical terminals 4 to the end portions of the electrical wires 9, a plurality of connection/disconnection portions 18, a plurality of space adjusting portions 19, and a control device 20.

The base 2 includes a bottom plate 21, an upstanding plate 22 vertically extending from one edge of the bottom plate 21, and an upper plate 23. The bottom plate 21 and the upper plate 23 are flat and parallel to each other.

The drive portion 3 includes a servomotor 24, an eccentric axle 26 driven by the servomotor 24, an up-and-down slider 27 engaging with the eccentric axle 26, and a drive plate 25. The terminal crimping apparatus 1 of the embodiment includes one servomotor 24, which is disposed on the upper plate 23 and attached to the upstanding plate 22. The eccentric axle 26 is eccentrically disposed on the servomotor 24. The up-and-down slider 27 is vertically driven with the servomotor 24 and the eccentric axle 26.

The drive plate 25 has a rectangular shape in plan view, and is disposed between and parallel to the bottom plate 25 and the upper plate 23. The drive plate 25 is attached to the up-and-down slider 27 and is vertically slidably guided by a linear guide (not shown) and is driven by the servomotor 24 via the up-and-down slider 27.

The servomotor 24 actuates up-and-down movement of the slider 27 to move the anvil 12 and crimper 13 toward and away from each other when the connection/disconnection portion 18 is linked to the drive plate 25 as described below. The embodiment shown in FIG. 1 shows the arrangement of one drive portion 3. It is apparent that the number of the drive portion 3 is smaller than that of the applicators 10.

Figure 3:
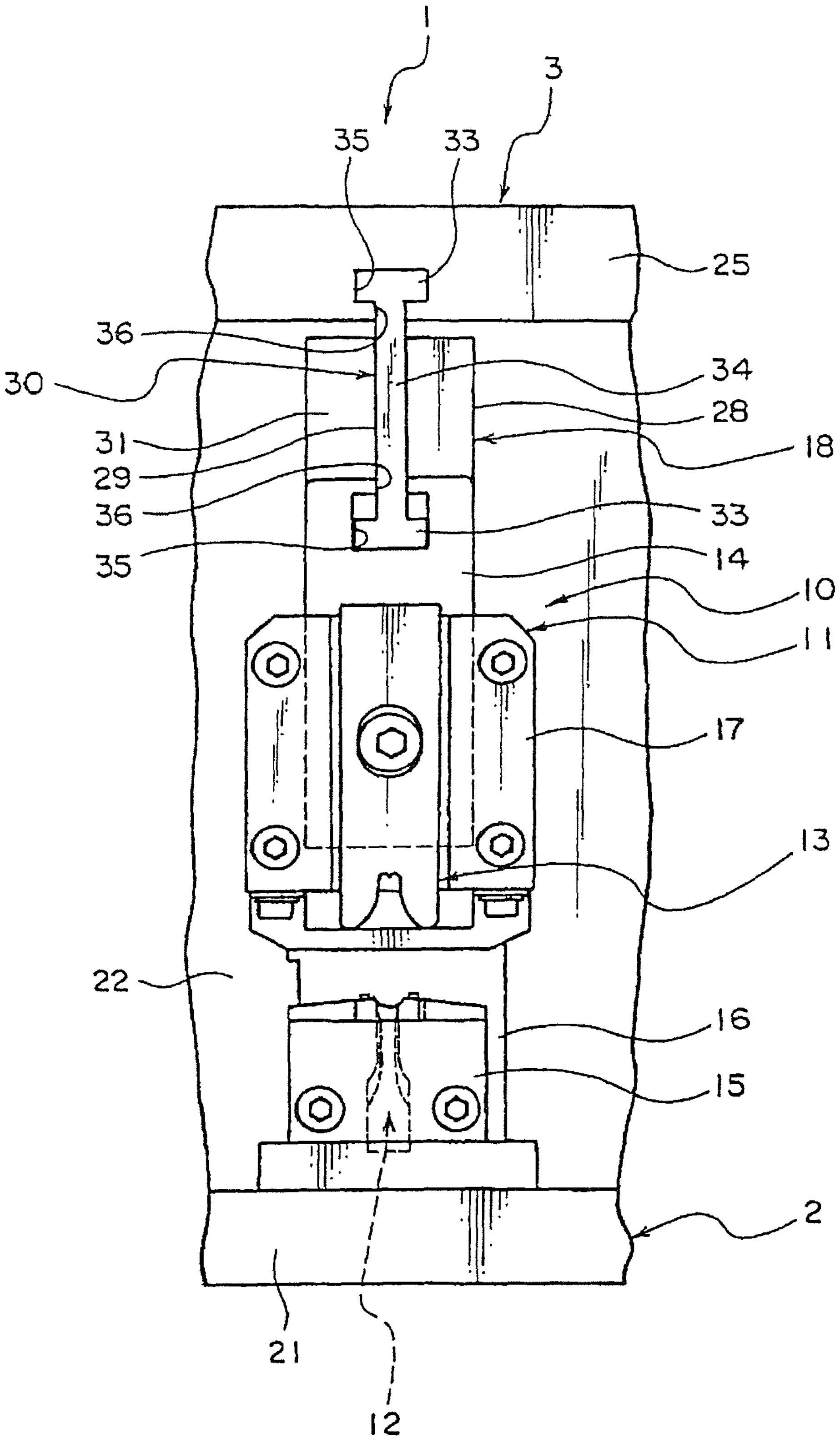
FIG. 3 is a front view of the applicator of FIG. 2.

The applicators 10 are disposed equally spaced along the lengthwise direction of the bottom plate 21. Referring to FIGS. 2 and 3, the applicators 10 each include a frame 11, a first or lower die (hereafter referred to as anvil), a second or upper die (hereafter referred to as crimper), and a ram 14.

The frame 11 has a reversed C-shape and is disposed on the bottom plate 21 of the base 2 and includes an anvil holder 15, an upwardly extending portion 16 and a ram holder 17. The anvil holder 15 is disposed on the bottom plate 21 and holds the associated anvil 12.

The upwardly extending portion 16 extends from the anvil holder 15 toward the servomotor 24. The ram holder 17 is connected with an upper end portion of the extending portion 16, and vertically slidably supports the ram 14. The ram holder 17 upwardly urges the ram 14 so as to separate the anvil 12 and the crimper 13 each other.

The anvil 12 includes a first anvil 12*a* and a second anvil 12*b*, both of which are fixed to the frame 11 via the anvil holder 15. The terminal 4 is set on the anvil 12.

The bottom wall 6*a* of the terminal 4 faces the anvil 12 when the terminal 4 is set on the anvil 12. The first anvil 12*a* accepts a portion of the bottom, wall 6 having the wire crimping members 7 and the second anvil 12*b* accepts a portion of the bottom wall 6 having the insulation crimping members 8. The wire crimping members 7 and the insulation crimping members 8 set on the anvil 12 are upwardly extending from the anvil 12.

The ram 14 has a cubic shape, and is vertically slidably supported with the ram holder 17. The ram 14 is slidable in the longitudinal direction of the up-and-down slider 27.

The crimper 13 is attached to the ram 14 and is vertically movable relative to the anvil 12. As the ram 14 upwardly and downwardly moves, the crimper 13 comes close or departs from the anvil 12.

The crimper 13 includes a first crimper 13*a* and a second crimper 13*b*. The first crimper 13*a* faces the wire crimping members 7 positioned on the first anvil 12*a* of the anvil 12.

The second crimper 13*b* faces the insulation crimping members 8 positioned on the second anvil 12*b* of the anvil 12.

The applicator 10 moves the crimper 13 toward the anvil 12 and crimps the terminal 4 to the end portion of the electrical wire 9 positioned between the anvil 12 and the crimper 13. The first crimper 13*a* bends the wire crimping members 7 toward the bottom wall 6*a* and crimps the wire crimping members 7 to the core wire of the electrical wire 9. The second crimper 13*b* bends the insulation crimping members 8 toward the bottom wall 6*a* and crimps the insulation crimping members 8 to the insulation of the electrical wire 9.

The spacing between the crimpers 13*a*, 13*b* and the anvils 12*a*, 12*b* is varied according to an outer diameter of the electrical wire 9. The spacing is adjusted to be small or large when the diameter of the electrical wire is small or large.

At least one of the anvil 12, the crimper 13, and the spacing between the anvil 12 and the crimper 13 of the applicator 10 has the part number different from the other applicators 10. At least one of the electrical wire 9 and the terminal 4 to be crimped has the part number different from others. The different combination of the part numbers of the electrical wires 9 and the terminals 4 is crimped with the respective applicators 10.

The connection/disconnection portions 18 are attached to the respective applicators 10 as shown in FIG. 1. Referring to FIGS. 2 and 3, the connection/disconnection portions 18 each includes a sliding cylinder 28, a sliding member 29 and a link portion 30.

The sliding cylinder 28 includes a cylinder main body 31 attached to the upstanding plate 22 and a rod 32 projecting from the cylinder main body 31. The rod 32 is horizontally disposed. The sliding cylinder 28 is positioned so that the rod 32 can be located between an upper end of the ram 14 and the drive plate 25 of the applicator 10.

The sliding member 29 is plate shaped and attached to the rod 32 and a lengthwise direction thereof is vertically positioned. The sliding members 29 each are horizontally slidable in a direction intersecting a direction, to which the associated anvil 12 and the crimper 13 relatively move, as the rod 32 extends. The sliding member 29 is slidably positioned at a connection position and a disconnection position. At the connection position (FIGS. 5-11), the sliding member 29 is positioned between the drive plate 25 and the applicator 10, and at the disconnection position (FIGS. 2 and 3), the sliding member 29 is positioned away from therebetween.

The link portions 30 each include wide portions 33 and a narrow portion 34 disposed on the sliding member 29, and wide through holes 35 and narrow through holes 36 disposed on the drive plate 25 of the drive portion 3 and the ram 14 of the respective applicators 10, respectively.

The wide portions 33 each are disposed on each end portion of the sliding member 29 (FIG. 3) and is flat. The wide portions 33 extend in a sliding direction of the rod 32 of the sliding cylinder 28.

The narrow portion 34 is positioned centrally of the sliding member 29 and between the two wide portions 33. The narrow portion 34 is narrower than the wide portions 33 about width. The narrow portion 34 is a plate vertically positioned.

The sliding members 29 each have a I-shaped cross section when viewed from front side (FIG. 3).

The wide through hole 35 and the narrow through hole 36 of the respective drive plates 25 are communicated together and extend in the sliding direction of the sliding member 29. The narrow through hole 36 is positioned more close to the applicator 10 than the wide through hole 35.

The wide through hole 35 and the narrow through hole 36 of the respective rams 14 are communicated together and extend in the sliding direction of the sliding member 29. The narrow through hole 36 is positioned more close to the drive plate 25 than the wide through hole 35.

The wide through holes 35 have almost the same width as the wide portions 33, where the width is similarly defined as the width of the electrical wire 9 and the terminal 4. The wide through hole 35 of the drive plate 25 has the same thickness as the wide portion 33. The wide through hole 35 of the ram 14 has sum of the thickness of the wide portion 33 and a thickness of a third wedge portion 40 of a wedge member 37 described below. The narrow through holes 36 have almost the same width as the narrow portion 34. It is apparent that the narrow through holes 36 have a width smaller than the wide through holes 35.

When the sliding member 29 of the apparatus 1 is positioned to the connection position, the wide portions 33 enter into the wide through holes 35 and the narrow portion 34 enters into the narrow through holes 36, respectively. The wide portions 33 and the narrow portion 34 thereby face inner surfaces of the wide through holes 36 and narrow through holes 36 and interfere therewith, respectively.

The link portion 30 thus interconnects the drive plate 25 of the drive portion 3 and the ram 14 of the applicator 10 with the sliding member 29. The link portion 30 allows relative movement of the anvil 12 and the crimper 13 toward and away from one another by means of the servomotor 24.

The connection/disconnection portion 18 assists sliding of the sliding member 29 and positioning the sliding member 29 at the connection position (a first state) and the disconnection position (a second state). At the first state, the servomotor 24 of the drive portion 3 transmits driving force to the applicator 10, and the second state, the transmission of the driving force is released.

Figure 4:
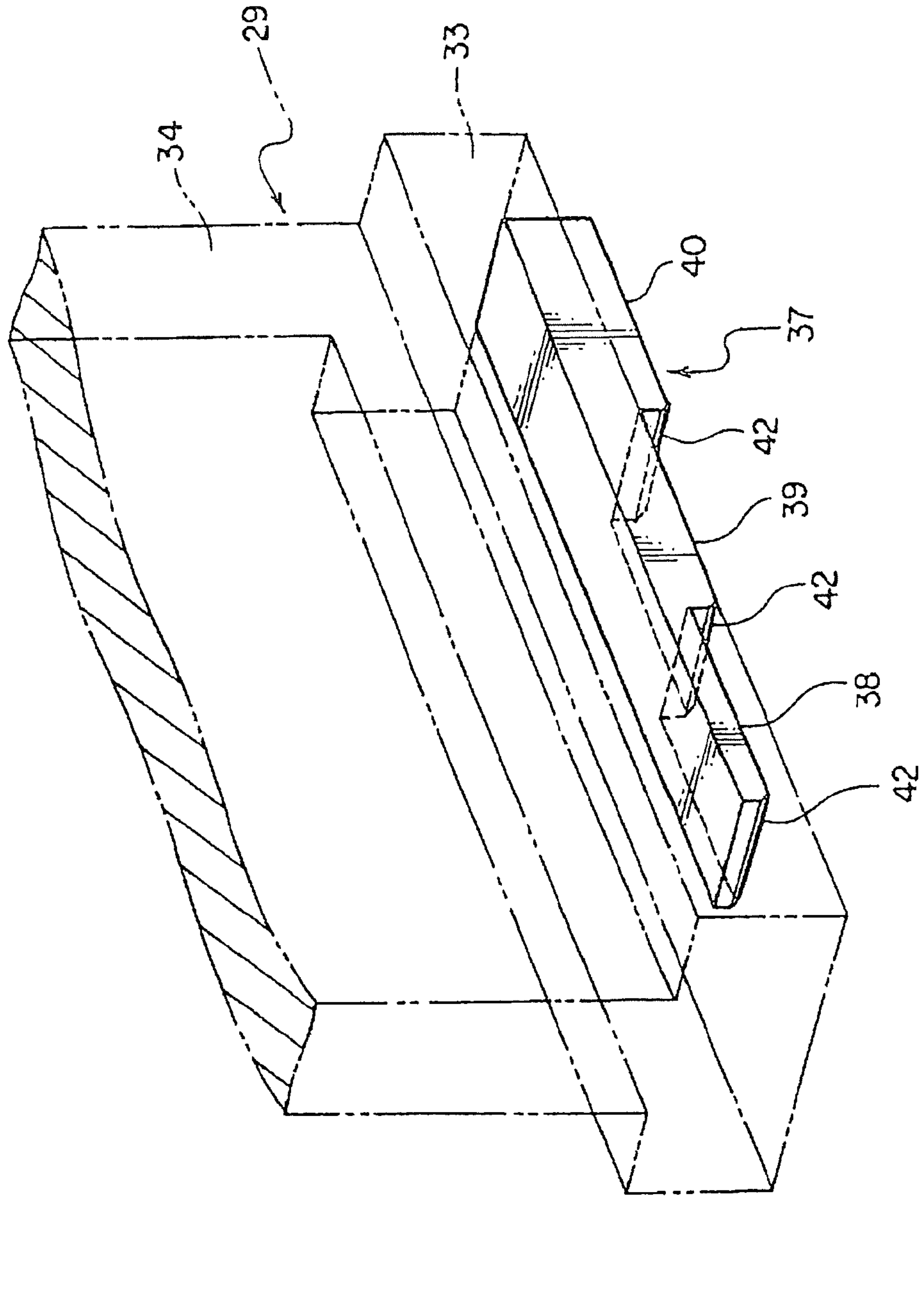
FIG. 4 is a perspective view showing a wedge member of the terminal crimping apparatus of FIG. 1.

Referring to FIG. 4, the space adjusting portions 19 of the terminal crimping apparatus 1 each include the wedge member 37, which integrally includes a first wedge portion 38, a second wedge portion 39 and the third wedge portion 40 with different thicknesses each other.

The wedge portions 38-40 are flat and have the respective thickness larger in order from 38 to 40. Upper surfaces thereof are flush each other. The first, the second and the third wedge portion 38-40 of the respective sliding members 29 are connected and positioned closely to the applicator 10 and the drive plate 25 in order.

The wedge members 37 each are disposed on a lower surface of the sliding member 29 and positioned near the rod 32 of the sliding cylinder 28. In the embodiment, each wedge member 37 is integral with the associated sliding member 29. Front portions of the wedge portions 38-40 are rounded off.

The wedge portions 38-40 are insertable between the sliding member 29 and the ram 14 of the associated applicator 10. When the sliding member 29 is positioned at the connection position, the wedge portions 38-40 of the wedge member 37 are placed in the wide portion 35 of the ram 14, or between the sliding member 29 and the ram 14. The ram 14 is thus downwardly pushed so that the crimper 13 comes close to the anvil 12.

Figure 5:
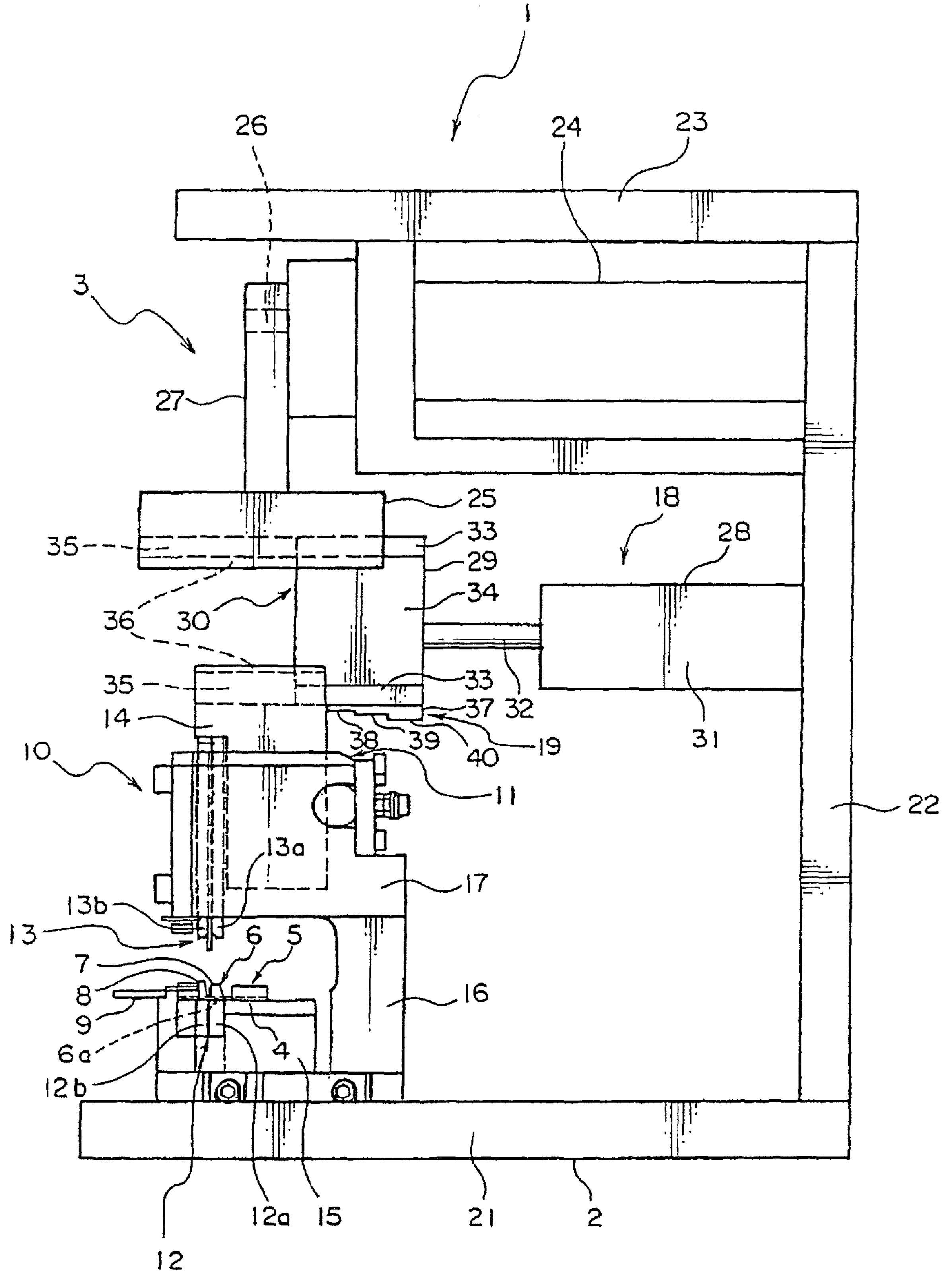
FIG. 5 is a side view showing the applicator of FIG. 2 linked with a drive portion.
Figure 6:
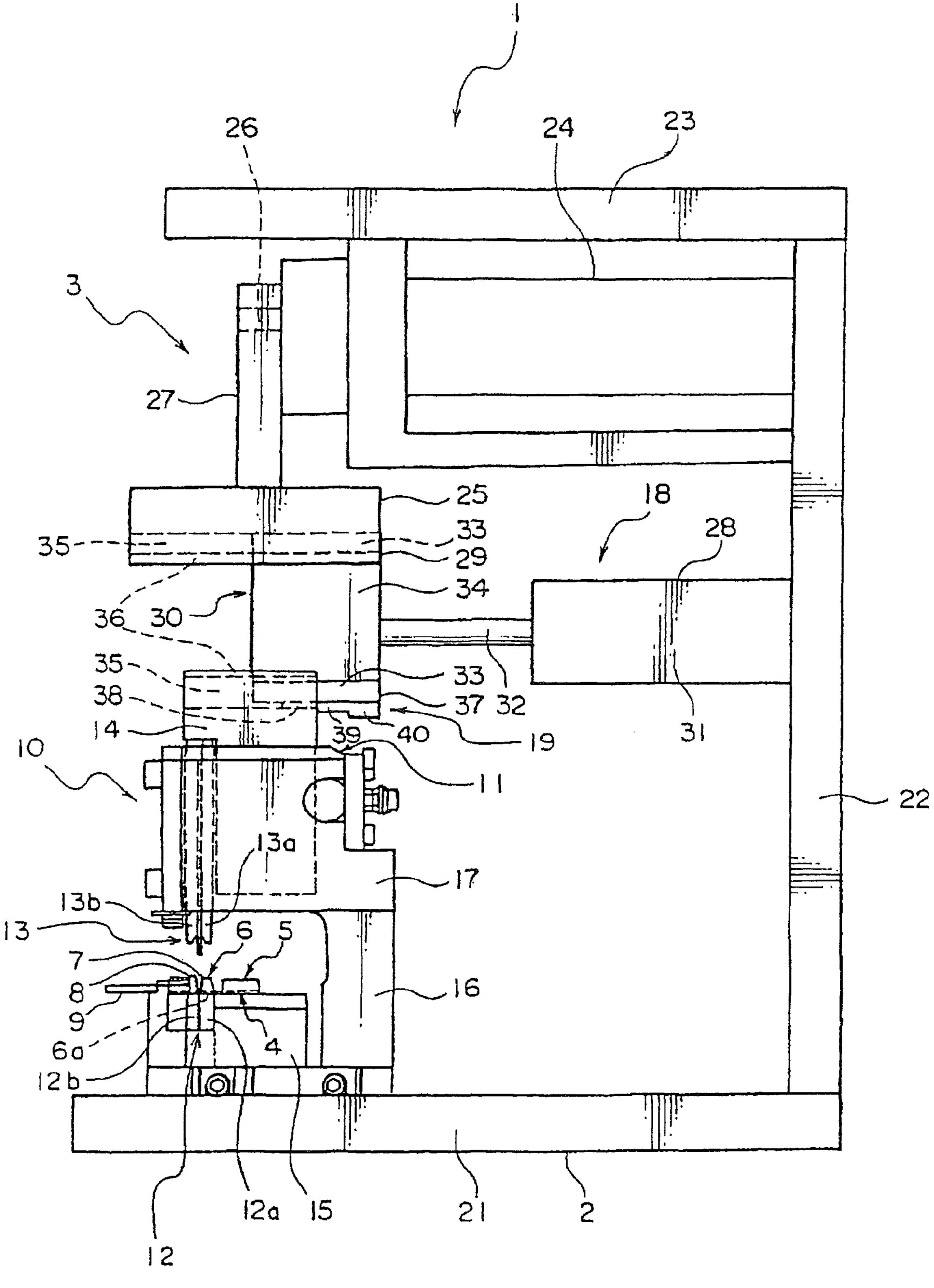
FIG. 6 is a side view showing the applicator linked with the drive portion, a first wedge portion of the wedge member of FIG. 4 being positioned between the applicator and a sliding member.
Figure 7:
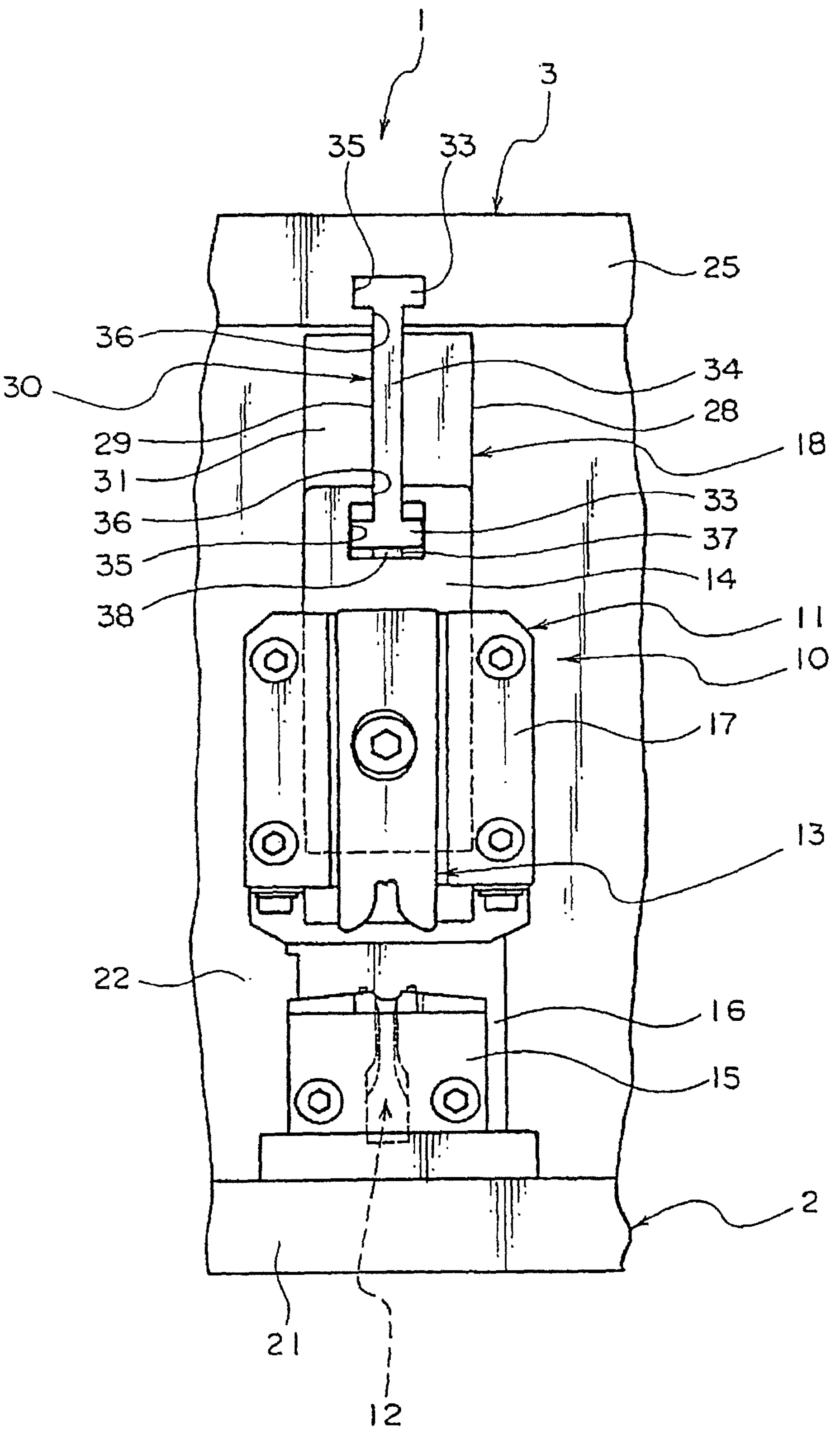
FIG. 7 is a front view of the applicator of FIG. 6.
Figure 8:
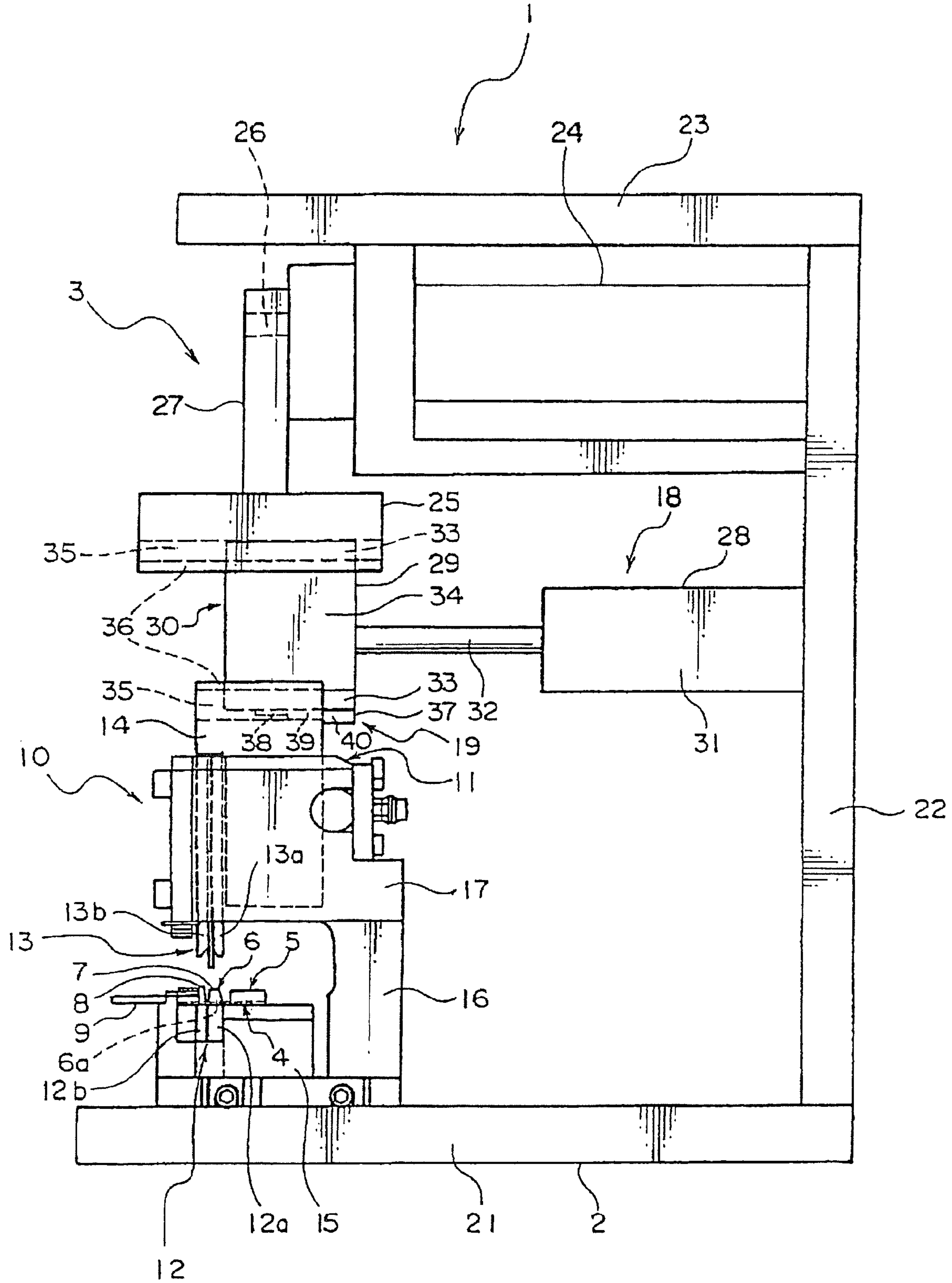
FIG. 8 shows a second wedge portion of the wedge member of FIG. 4 positioned between the applicator and the sliding member.
Figure 9:
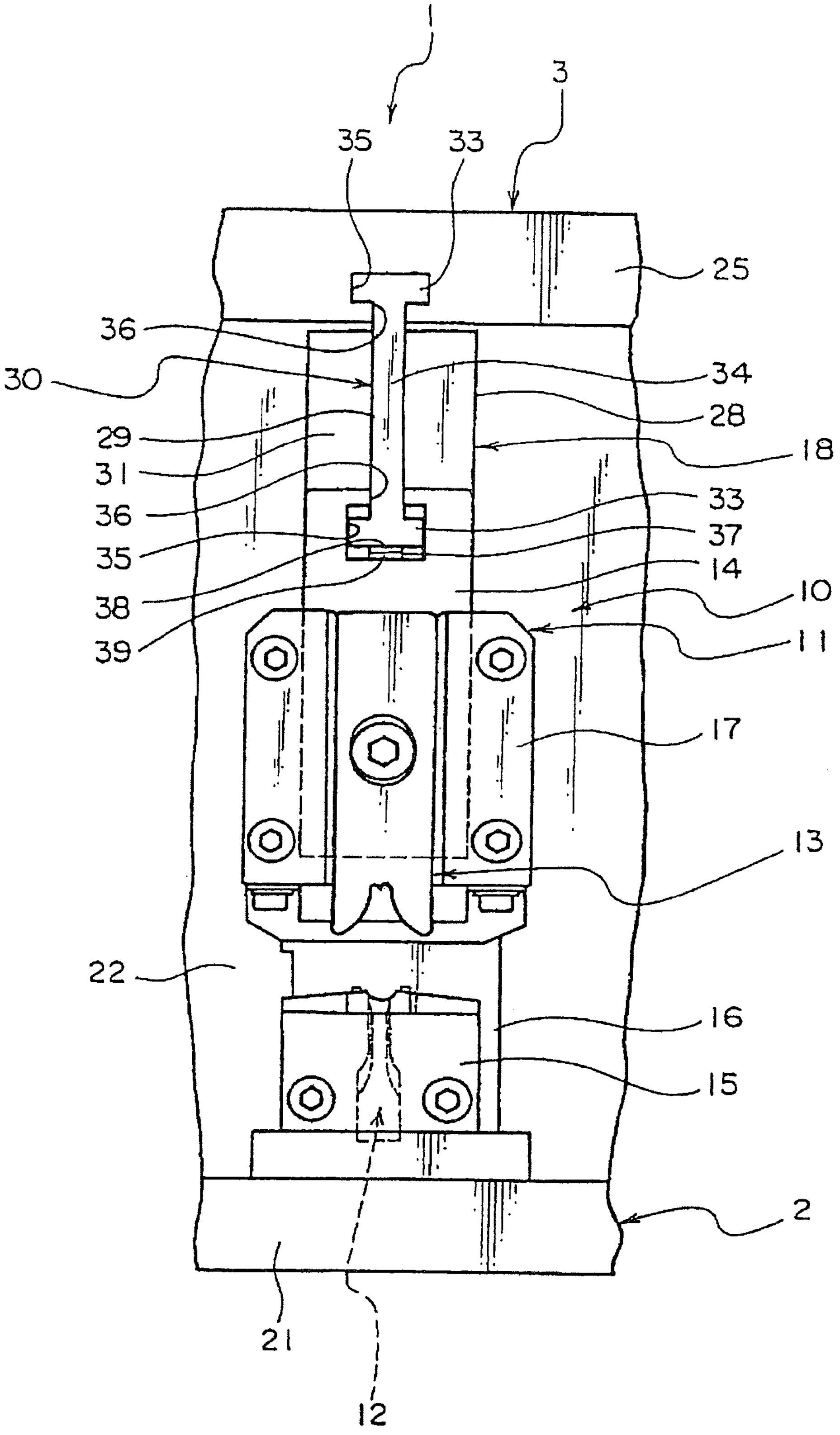
FIG. 9 is a front view of the applicator of FIG. 8.
Figure 10:
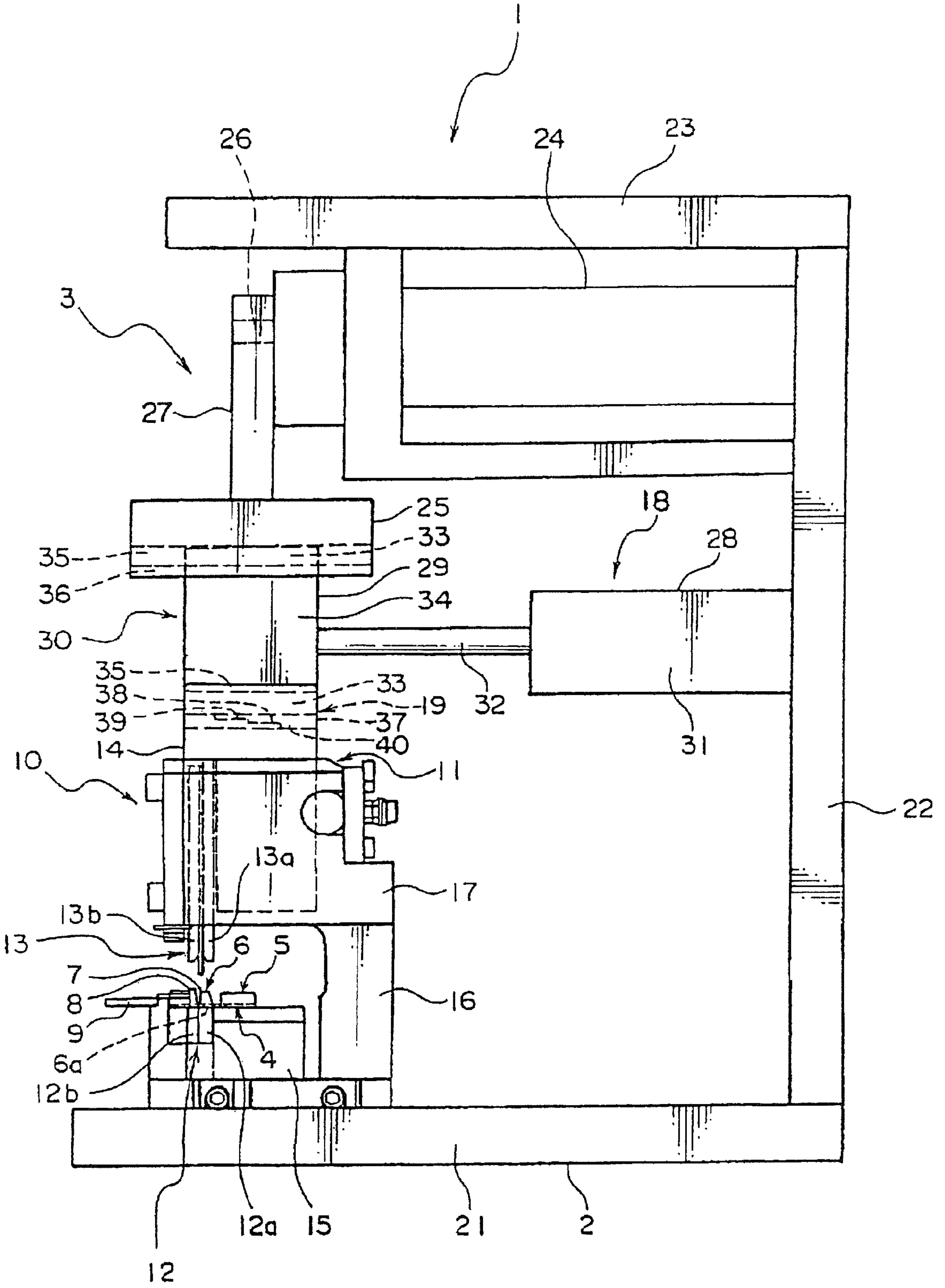
FIG. 10 shows a third wedge portion of the wedge member of FIG. 4 positioned between the applicator and the sliding member.
Figure 11:
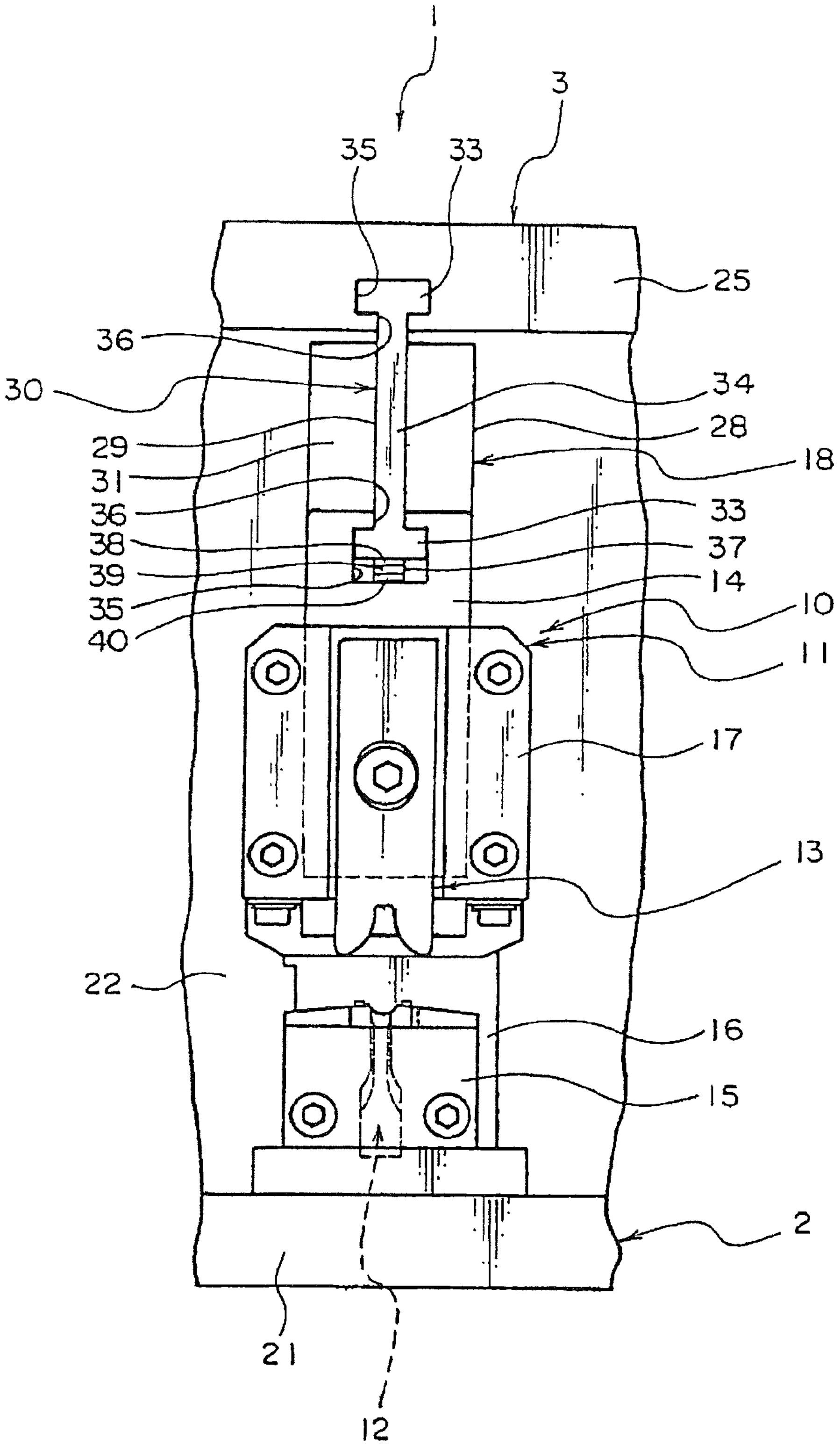
FIG. 11 is a front view of the applicator of FIG. 10.

FIG. 5 shows the applicator 10 linked with the drive portion 3, FIG. 6 shows the first wedge portion 38 inserted between the applicator 10 and the sliding member 29, FIG. 8 shows the second wedge portion 39 inserted between the applicator 10 and the sliding member 29, and FIG. 10 shows the third wedge portion 40 inserted between the applicator 10 and the sliding member 29. The spacing between the anvil 12 and the crimper 13 becomes narrower as the wedge portions 38-40 are inserted in order of the first to the third wedge portion 38-40.

The spacing between the anvil 12 and the crimper 13 can be adjusted by inserting the respective wedge portions 38-40 or without insertion of the wedge member 40 between the sliding member 29 and the ram 14 of the applicator 10.

The control device 20 is a computer including an input device, a ROM, a RAM and a CPU. The control device 20 is connected to the drive portion 3 and the connection/disconnection portions 18 to control the terminal crimping apparatus 1.

The input device is utilized for inputting the part numbers of the electrical wires 9 and the terminals 4, and the number of the parts to be crimped. The ROM stores an operation program of the CPU or the terminal crimping apparatus 1. The ROM stores the part numbers of the electrical wires 9 and the terminals 4, the associated applicators 10, and the spacing between the respective anvils 12 and crimpers 13 (depending on whether or not the wedge portions are inserted).

The RAM temporally stores data required for the CPU. The CPU selects the applicator 10 and the spacing between the anvil 12 and the crimper 13 of the applicator 10, from the information stored in the ROM in accordance with the input data of the input device. The CPU requests the sliding cylinder 28 to extend the rod 32 of the connection/disconnection portion 18 so as to link the drive plate 25 with the applicator 10 by means of the sliding member 29. The CPU further controls the amount of extension of the rod 32 of the sliding cylinder 28 with or without insertion of the wedge portions 38-40 to meet with the selected information.

The CPU controls the spacing between the anvil 12 and the crimper 13 in accordance with the input information about the part numbers of the electrical wire 9 and the terminal 4. The CPU requests the servomotor 24 of the drive portion 3 to downwardly move the up-and-down slider 27 so that the associated anvil 12 and crimper 13 come close to each other to crimp the terminal 4 to the electrical wire 9. When the CPU completes crimping of the required number of the electrical wires 9 and the terminals 4, the CPU requests retraction of the rod 32 of the sliding cylinder 28 to disconnect link between the drive portion 3 and the applicator 10.

The control device 20 thus selects one applicator 10 among the plurality of applicators 10 to crimp the terminal 4 to the electrical wire 4 with the drive portion 3. The control device 20 controls the applicator 10 corresponding to the associated part numbers of the electrical wire 9 and the terminal 4.

The operation of crimping the terminal 4 to the electrical wire 9 with the terminal crimping apparatus 1 is summarized below. The part numbers of the electrical wire 9 and the terminal 4, and the number of crimping are inputted with the input device. The up-and-down slider 27 is positioned at the uppermost position and all of the rods 32 of the sliding cylinders 28 are retracted. The control device 20 controls the connection/disconnection portion 18 to link the applicator 10 with the drive plate 25 in accordance with the inputted part numbers of the electrical wire 9 and the terminal 4. The CPU requests the up-and-down slider 27 to downwardly move to crimp the terminal 4 to the electrical wire 9. When the required crimping is completed, the CPU requests the sliding cylinder 28 to retract the sliding member 29 to disconnect link between the drive plate 25 and the applicator 10. The terminals 4 and the electrical wires 9 with the desired part numbers are crimped by the desired number of crimping.

According to the embodiment of the present invention, the number of the drive portion 3 is smaller than that of the applicators 10, so that the terminal crimping apparatus 1 can be miniaturized.

The connection/disconnection portions 18 each connect and disconnect the driving force of the drive portion 3 with and from the associated applicator 10. The connection/disconnection portions 18 are controlled with the control device 20 so that the arbitrary applicator 10 among the plurality of applicators 10 can assuredly achieve crimping the terminal 4 to the electrical wire 9. The drive portion 3, the number of which is smaller than that of the applicators 10, can assuredly achieve crimping the each terminal 4 to the each electrical wire 9.

The connection/disconnection portions 18 each transmit the driving force of the drive portion 3 only to the selected applicator 10 among the plurality of applicators 10, not transmitting to the applicators 10 which are not utilized for crimping. It is not necessary to employ a large size of the servomotor 24 and the drive portion 3. The terminal crimping apparatus 1 can be miniaturized even with the small number of the drive portions 3.

The each sliding member 29 and link portion 30 connect and disconnect the driving force of the drive portion 3 to the associated applicator 10. The driving force is assuredly transmitted to the desired applicator 10 among the applicators 10.

The interference between the wide portions 33 and the inner surfaces of the wide through holes 35 assuredly transmits the driving force of the drive portion 3 to the respective applicators 10 and ensures crimping the each terminal 4 to the each electrical wire 9.

The space adjusting portions 19 enable the terminal crimping apparatus 1 to crimp the terminals 4 and the electrical wires 9 with the part numbers more than the number of the applicators 10 mounted on the apparatus 1.

The wedge portions 38-40 of the each applicator 10 can variably adjust the spacing between the anvil 12 and the crimper 13, so that the electrical wires 9 and the terminals 4 with a large number of the part numbers can be crimped.

The each wedge member 37 is integral with the each sliding member 29 and thus it is not necessary to dispose means for sliding the wedge member 37, so that the part numbers are decreased, resulting in avoiding a larger size of the apparatus 1.

The each connection/disconnection portion 18 is disposed on the each applicator 10 and thus the driving force of the drive portion 3 is assuredly transmitted to the applicator 10 to assuredly crimp the terminal 4 to the electrical wire 9.

Figure 12:
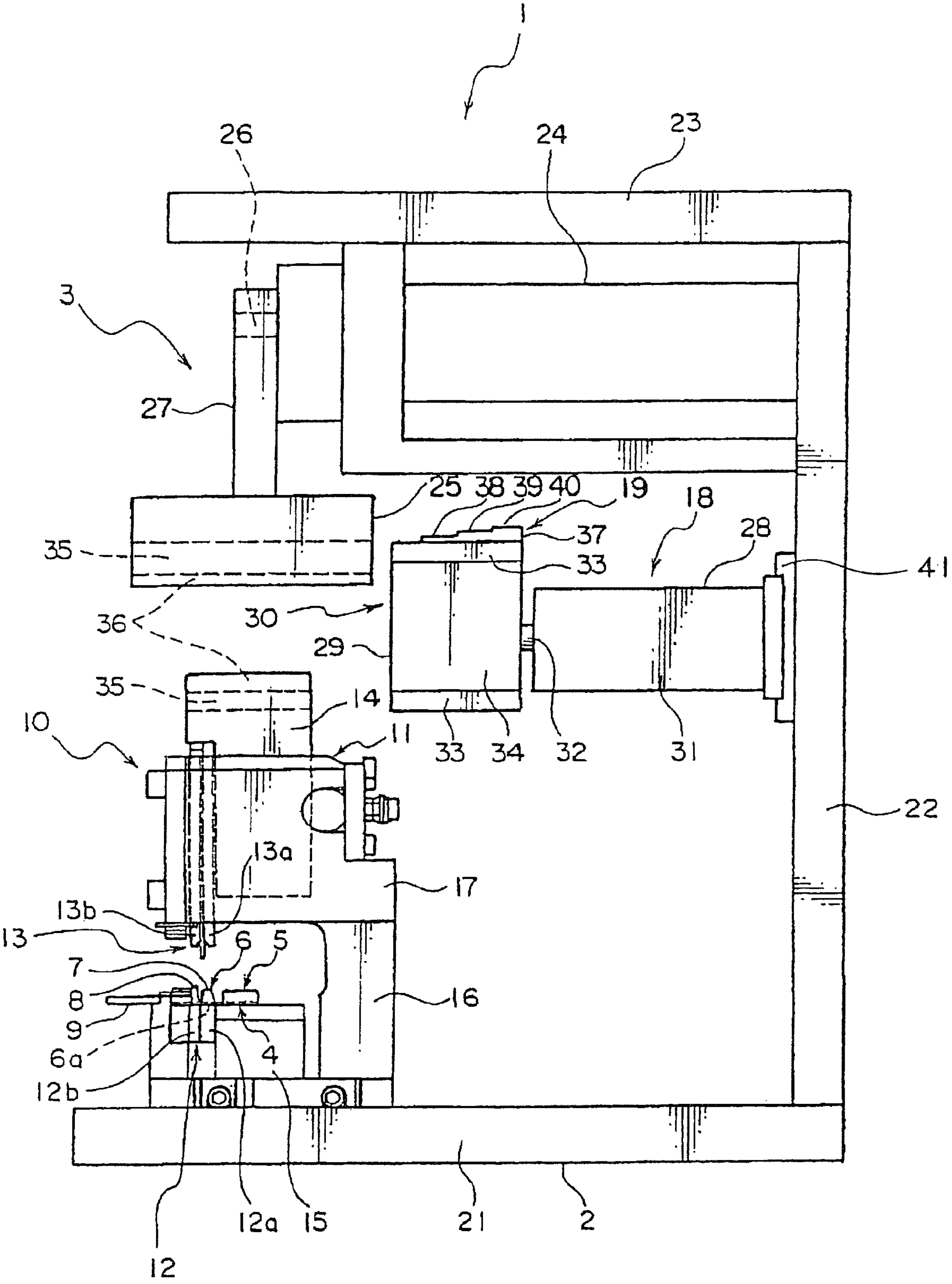
FIG. 12 is a side view showing an alternative embodiment of the applicator of the terminal crimping apparatus of FIG. 2.

In the embodiment described above, the each wedge member 37 is disposed on the lower surface of the each sliding member 29 so that the wedge portions 38-40 are insertable between the sliding member 29 and the applicator 10. The each wedge member 37 can be disposed on an upper surface of the each sliding member 29 so that the wedge portions 38-40 are insertable between the sliding member 29 and the drive plate 25 of the drive portion 3 as shown in FIG. 12. Like part has like reference numeral.

The sliding cylinders 28 of FIG. 12 each are vertically slidably supported with a known linear guide 41 disposed between the sliding cylinder 28 and the upstanding plate 22.

The wedge members 37 each can be formed separately from the sliding member 29 with aid of a drive portion to slide. The wedge members 37 or the sliding members 29 can be slid without the drive portions.

It is appreciated that the electrical wires 9 and the terminals 4 with different part numbers can be crimped at the same time with the plurality of applicators 10 and the drive portions 3. The plurality of drive portions 3 can be disposed as far as the number thereof is smaller than that of the applicators 10.

The embodiments described above are only exemplary and not limited thereto. Any modification and alteration of the present invention are within the scope of the present invention.

What is claimed is:

1. A terminal crimping apparatus comprising:

a plurality of applicators each including a first die and a second die opposing the first die for crimping a terminal to an electrical wire, the applicators each crimping a different part number of the terminal and the electrical wire together;

a base supporting the applicators disposed equally spaced along a lengthwise direction of a bottom plate of the base;

a drive portion for producing a driving force to move the first die and the second die toward and away from each other, a number of the drive portion being smaller than that of the applicators;

a plurality of connection/disconnection portions each disposed corresponding to the plurality of applicators, and each positionable at a first state, in which the driving force is transmitted to one of the first die and the second die of the associated applicator, and a second state, in which the driving force is released from the one of the first die and the second die of the applicator; and a control device for controlling one or more connection/disconnection portions associated with one or more applicators corresponding to the part numbers of the electrical wire and the terminal to lie in the first state so that the applicator corresponding to the part numbers of the electrical wire and the terminal can achieve crimping the electrical wire and the terminal together with the driving force from the drive portion.

2. The terminal crimping apparatus as claimed in claim 1, wherein the each connection/disconnection portion includes a sliding member slidably positionable at a connection position and a disconnection position, the connection/disconnection portion being positioned between the drive portion and the applicator at the connection position, and positioned between and away from the drive portion and the applicator at the disconnection position, and a link portion disposed on the drive portion, the applicator and the sliding member, for connecting the drive portion with the applicator by means of the sliding member.

3. The terminal crimping apparatus as claimed in claim 2, wherein the each link portion includes wide portions disposed on an upper end and a lower end of the each sliding member and extending in a sliding direction of the sliding member, a narrow portion disposed between the wide portions and extending in the sliding direction of the sliding member, the narrow portion being narrower than the wide portions, wide through holes disposed on the drive portion and the applicator, respectively, extending in the sliding direction of the sliding member for accepting the respective wide portions therein when the sliding member is positioned at the connection position, and narrow through holes disposed on the drive portion and the applicator, respectively, extending in the sliding direction of the sliding member for accepting the respective narrow portion therein when the sliding member is positioned at the connection position.

4. The terminal crimping apparatus as claimed in claim 1, further comprising a plurality of space adjusting portions each for adjusting a space between the first die and the second die of the associated applicator at the connection position.

5. The terminal crimping apparatus as claimed in claim 4, wherein the each space adjusting portion includes a wedge member having a plurality of wedge portions for adjusting the spacing between the first die and the second die, the wedge member being insertable between the applicator and the sliding member, or between the sliding member and the drive portion, when the sliding member is positioned at the connection position.

6. The terminal crimping apparatus as claimed in claim 5, wherein the each wedge member is integral with the associated sliding member.

7. The terminal crimping apparatus as claimed in claim 1, wherein the each connection/disconnection portion is disposed on the each applicator.

* * * * *